Sept. 12, 1939.   H. G. MILLER   2,172,398
FACSIMILE SYSTEM

Filed Nov. 20, 1936

Horace G. Miller
INVENTOR

BY
ATTORNEY

Patented Sept. 12, 1939

2,172,398

UNITED STATES PATENT OFFICE 2,172,398

FACSIMILE SYSTEM

Horace G. Miller, Philadelphia, Pa., assignor to Radio Inventions, Inc., New York, N. Y., a corporation of New York Application November 20, 1936, Serial No. 111,770

6 Claims. (Cl. 178—11)

This invention relates to facsimile systems of recording pictures, news and the like, and more particularly to such systems as those which use a reciprocating stylus, or its equivalent, at the receiver, so that effective recording takes place only when the stylus is moving in a single direction.

Such systems ordinarily suffer from the disadvantage that only a portion of the time available for transmission is used for recording. A portion of the waste time of the return stroke has been utilized to advantage, as by the transmission of synchronizing signals during this time, but the actual time needed for the transmission of such signals, may be only a small fraction of the total time available during the return stroke.

More of the total time available for transmission has been effectively used by returning the recording stylus at a higher rate of speed than that allowable for efficient marking. Such a procedure requires careful design to maintain synchronism and precision of marking, and even when the highest practical return speed is used there is yet the waste of considerable time in any event.

Those systems which use a stylus which is continuously in contact with the surface of an electrolytic recording paper, during its marking stroke, may suffer from further disadvantages, when provisions are made for slowing up the effective speed of the stylus near the two respective ends of its stroke.

It is desirable to use the maximum marking current which can be passed without the generation of undue heat, and such limit of current value is determined, inter alia, by the instantaneous speed with which the stylus is traversing the surface of the paper. Thus when the maximum current is used with such recorders, so that the greatest efficiency may be had in the main central portion of the picture, there may be a burning effect at or towards the margins of the same, due to the lowered stylus velocity. Likewise if there is a current flow at the instant when the stylus is coming into contact with, or breaking its contact with, the surface of the paper, there may also be at this instant a very pronounced tendency for the paper to burn.

I have devised a method of efficiently utilizing the time which ordinarily is wasted in the type of systems just referred to, and in addition, of overcoming the various burning effects just referred to.

Broadly speaking, my invention contemplates the provision of a switch actuated by or synchronously with the movements of the stylus towards the ends of its stroke, which will transfer the energy from the marking stylus at the receiver either to some other circuit of utilization, or else will merely cut off this current at those portions of the stylus traverse where there is danger of the burning effect occurring. Alternatively or in addition, a similar switch may be employed at the transmitter to cut off the transmitted signal, thus preventing burning at the receiver under normal operating conditions. Under conditions when the transmitter and recorder are not in synchronism, or when extraneous or interfering electrical impulses are actuating the recorder, a switch at the recorder will serve to prevent unsightly marginal markings.

One purpose of my invention is to avoid the uneven marking or burning effects which may occur in electrolytic recorders of the types above described.

Another purpose is to allow the more useful utilization of the total time available upon a circuit used to transmit signals between intermittently operating facsimile transmitters and receivers.

Another object of this invention includes the automatic switching of signal circuits by the operation of the receiver itself, so that such receiver will be in circuit only when actually recording and so that during the time when the receiver is not so recording, such signal circuit will be available for other purposes, such as the transmission of synchronizing or other signals.

I now refer to the drawing which shows certain embodiments of my invention, and where:

Figure 1:
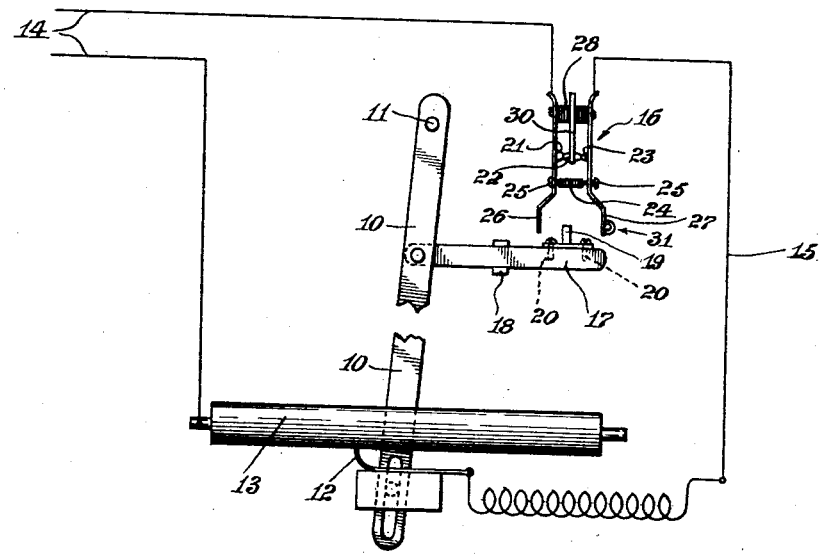
Fig. 1 shows a portion of a recorder including a switch to practice my invention.

Referring now to the switch mechanism, the arm 10 represents the reciprocating scanning arm of a receiver, but it will be plain that such arm, or its equivalent can equally well represent the reciprocating scanning arm of a similar type of transmitter. This arm rotates about a suitable axis 11 and at its outer end bears upon a marking stylus 12, which cooperates with a platen 13, Recording paper (not shown) is to be passed between the stylus and the platen. Likewise it will be seen that this stylus and platen may be replaced at the transmitter by some form of pick-up, and some member over which the image to be transmitted is optically or physically passed.

Conductors 14 supply the signal energy to the receiver, or in the case of the transmitter, carry away the image signal picked up thereby. In a receiver, one of these conductors is connected to the platen, and the other goes to switch 16, which in turn is connected by another conductor 15 to the stylus. Thus it will be seen that the switch is in series with the marking circuit, and that when this switch is open, there will be no signals supplied to the recording element.

Figure 2:
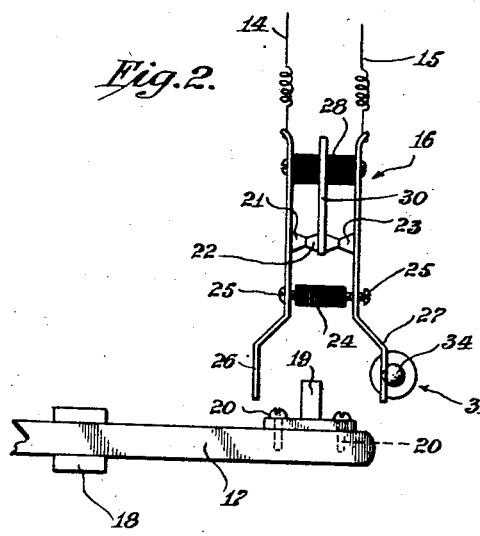
Fig. 2 shows a detail of the switch and its actuating mechanism.
Figure 3:
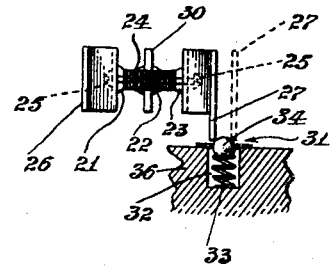
Fig. 3 is an end elevation of a portion of the switch, showing a retaining mechanism.

The arm 10 has hingedly affixed thereto, another arm 17, carried in a suitable guide 18, (Fig. 2) and bearing upon its extremity a post 19, affixed thereto by screws 20, and serving to actuate the switch 16. Arm 17 thus is subject to a reciprocating linear motion, by the corresponding traverse of the scanning arm 10.

The switch 16 is of the double series break type, the two sets of contact points 21, 22 and 22, 23 being in series with each other, so that if either one of these sets of points is open, the circuit through the switch will be broken. A member 24, of insulating material, provided with adjustment screws 25, 25 serves to limit the spread of two metal springs 26 and 27, which are each fastened at one end to a suitable block of insulating material 28. Intermediate contact 22 is carried on a metal strip 30, which is sufficiently rigid so that it will not be substantially displaced by the spring action of elements 26 and 27.

A device is provided at the end of spring 27 to keep that particular spring either in its open or in its closed position, until a sufficient force is applied thereto to overcome the action of this holding device 31, which comprises a cavity 32 in any suitable block 36, and containing a coiled spring 33, bearing a ball 34 of steel or other suitable hard material upon its upper end. The pushing of spring arm 27 in either direction will compress the spring 33 sufficiently to allow the end of the spring arm 27 to pass to the opposite side of the ball 34, while the expansion of the spring 33, will push up the ball again, until a force is applied to spring arm 27, great enough again to compress spring 33.

The operation of the switch is as follows: when arm 17 approaches the right end of its traverse, pin 19 engages spring 27 and opens contacts 22, 23.

At the same time holding device 31 is caused to function, so that when arm 17 returns toward the left, the contact will still remain open. Thus the contacts, when adjusted in the manner shown, will act so as to open the circuit to the stylus before the scanning arm is at the end of its stroke towards the right, and hold the circuit open as the arm is moving in a left direction, i. e. during the first part of its non-marking stroke.

As the scanning arm approaches the left end of its non-marking stroke, and consequently the arm 17 and the pin 19 are doing the same, the pin 19 engages spring arm 26 and breaks contacts 21, 22. As the spring arm 26 continues to move, member 24 will become effective at a position which may be determined by the adjustment of screws 25, 25 so as to cause arm 27 to be retracted towards the left, so that contacts 22, 23 come together, but the circuit is still open at contacts 21, 22, and these last mentioned contacts will not come together until the arm 17 has reached the left end of its traverse and has started to move back upon its right hand, or marking stroke, and thus traversed in this direction for a predetermined distance.

As just described, the circuit is closed only during a portion of its marking stroke, and the current is cut off during those times when the speed of the stylus may be substantially less than the maximum, and at the times when the stylus may be retracted from the paper surface, as is often done during the return stroke in such recorders.

It may be seen that in case other means are provided for breaking the recording circuit, as by removing the stylus from the paper, holding device 31 may be omitted, as the circuit may be opened at contacts 21, 22 or 22, 23, so that burning is avoided when the stylus leaves the paper, and the stylus may remain out of contact with the paper during the entire return stroke.

Likewise this switch without holding device 31 may be used with recording systems which mark when the stylus is traversing in both directions or with systems wherein the stylus traverses the recording surface always in the same direction.

It will be evident that by the adjustment of the various screws, and/or by the shaping of the spring arms and the adjustment of the position of the pin 19, in reference to the traverse of the arm 17, this switch may be adjusted so as to cut off the current during any desired portions of the cycle of operation of the recording machine.

The operation of my invention is thought clearly to be apparent from the foregoing description and possible uses thereof, additional to those hereinbefore stated, will be apparent to those skilled in the art and I therefore do not limit the scope of this invention except as defined by the hereunto appended claims.

In these appended claims, by the use of the term "recorder", I refer to the actual recording or marking stylus, as distinguished from the entire receiver, since it can be seen that the switch of my invention may be interposed at any point in the electrical transmission circuit extending between the photo-electric cell of the pick-up and this actual recording stylus.

I claim:

1. In a facsimile system, reciprocating means for scanning, electro-optical translation means carried by said reciprocating means, spring retractive switching means operative to break the electrical connection between said translation means and the signal transmission circuit, mechanical means actuated reciprocatingly by said scanning means and operative to open said switching means when said scanning means is near one end of its stroke and moving in one direction, discrete retaining means keeping said switching means open during at least part of the motion of said scanning means in the other direction and means reciprocatingly actuated by said mechanical means when said scanning means is not far from the other end of its stroke and reciprocatingly operative first to open said switching means and then to release said retaining means, whereby said spring retractive switching means will be closed during at least part of the motion of said scanning means in said first mentioned direction.

2. In a facsimile electro-optical translation device of the reciprocating scanner type, a double break switch including two spring arm members connected to the respective terminals of a series break in the electrical circuit of said device, a center contact member located between said spring members and normally in contact with both said spring members whereby the circuit is closed, a mechanical trip reciprocatingly actuated by the reciprocating scanner near one end of its traverse so as to separate one spring member from said center contact member and open the circuit, and reciprocatingly actuated by the scanner near the other end of its traverse so as to separate the other spring member from said center contact, and a holding device maintaining said first spring member away from said center contact, after said spring member has been actuated by said trip, until said trip reciprocatingly actuates said second spring member, and means whereby said second spring member upon actuation by said trip, will pull said first spring member out of engagement with said holding device.

3. A facsimile recorder of the reciprocating stylus type marking only while the stylus moves in one direction including a normally closed switch in series with the recording circuit, reciprocating means actuated in synchronism with the reciprocating stylus and opening said switch and holding it open during the end portions of the stroke of said stylus, and discrete means for maintaining an additional series opening at some portion of said recording circuit after the initial opening thereof by said switch, said last mentioned discrete means acting to maintain said circuit open independently of said switch operative means during at least a portion of the non-marking stroke of said stylus.

4. In a facsimile recorder of the reciprocating stylus type, switching means for opening the signal circuit thereto, mechanical means reciprocatingly operated in synchronism with the reciprocating stylus and means whereby said mechanical means reciprocatingly operates said switching means, opens said circuit whenever said stylus is near the end of its stroke, maintains said circuit open while said stylus is reversing its motion, and closes said circuit during the actively marking portion of the stroke.

5. A facsimile recorder switching system capable of operation solely by reciprocating motion and including a stylus arm reciprocatingly in motion but marking only when moving in a single direction, a switch in series with the marking circuit of said stylus, means operated by said reciprocating arm and mechanically and reciprocatingly operating said switch so as to open said marking circuit during both end portions of the stroke of said stylus arm, said switch also including additional discrete holding means operating independently at times of said switch operative means so as to maintain said circuit open during at least a portion of the time that said stylus arm is moving in its non-marking direction.

6. In a facsimile scanner of the reciprocating scanning arm type, switching means for opening the signal circuit connected thereto, mechanical means reciprocatingly operated in synchronism with said reciprocating scanning arm and means whereby said mechanical means reciprocatingly operates said switching means, opens said circuit whenever said scanning arm is near the end of its stroke, maintains said circuit open while said scanning arm is reversing its direction of motion, and closes said circuit during the actively scanning portions of the stroke of said scanning arm.

HORACE G. MILLER.